(12) United States Patent
Liu et al.

(10) Patent No.: US 7,509,660 B2
(45) Date of Patent: Mar. 24, 2009

(54) DISC RETRIEVAL AND RELEASE APPARATUS AND METHOD

(75) Inventors: Ming-Hsun Liu, Taipei (TW); Chih-Hung Shen, Taoyuan County (TW); Chung Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 370 days.

(21) Appl. No.: 11/313,946

(22) Filed: Dec. 22, 2005

(65) Prior Publication Data

US 2007/0147191 A1    Jun. 28, 2007

(51) Int. Cl.
    *G11B 21/08*    (2006.01)
(52) U.S. Cl. .................................................. 720/615
(58) Field of Classification Search ................ None
    See application file for complete search history.

(56) References Cited

U.S. PATENT DOCUMENTS 5,959,959 A * 9/1999 Watanabe ................. 720/713
6,141,298 A * 10/2000 Miller ...................... 369/30.33
6,636,462 B1 * 10/2003 Drynkin et al. .......... 369/30.19
7,127,725 B2 * 10/2006 Lee ............................ 720/600

* cited by examiner

*Primary Examiner*—Mark Blouin
(74) *Attorney, Agent, or Firm*—Morris Manning Martin LLP; Tim Tingkang Xia, Esq.

(57) ABSTRACT

The disc retrieval and release apparatus and method has a retrieve and release member for retrieving and releasing a disc for processing. The retrieve and release member releases one of the discs into and retrieves it from a wait processing region where the upper side of the disc tray is. The retrieve and release member enters and exits the wait processing region slantwise when the moving arm moves thereto. Thus, the embodiment releases the unprocessed disc into the wait processing region, and then retrieves the processed disc from the wait processing region after the unprocessed disc is processed. Thus, the discs are retrieved from a disc tray of the optical drive that extends out completely or incompletely, and they are released into the disc tray easily.

7 Claims, 7 Drawing Sheets

DISC RETRIEVAL AND RELEASE APPARATUS AND METHOD

BACKGROUND OF THE INVENTION

1. Field of Invention

The invention relates to a retrieval and release apparatus and method used with discs for retrieving the discs from a disc tray and releasing the discs into the disc tray automatically.

2. Related Art

As more and more people become used to dealing with digital information in their daily lives, different information storage devices are being produced. Considering the low cost of discs and improvements in optical disk drives, the information storage device that most people use is a disc.

Discs copying technology falls into two categories, tabletting and recording. Tabletting is used for copying a great quantity of discs. For copying a small quantity of discs, tabletting costs more than recording because of the larger scale of tabletting. The recording speed of the recorders is improving and their price is lowering. So, people choose recording instead of tabletting for copying a small quantity of discs.

However, time-consumption and uneconomical labor expenses are its disadvantages. That is, even when there are few discs, people still have to record the discs one by one, which wastes much time and labor. To overcome the above disadvantages, thus a recording system satisfying the demand of efficiently copying discs has been manufactured. The recording system uses a mechanical arm under a computer controlling system to retrieve an unrecorded disc from an unrecorded disc stack and release the unrecorded disc into the disc tray of the optical disk drive. After the unrecorded disc is recorded, the mechanical arm retrieves the recorded disc and releases the discs into a recorded discs stack. By the computer controlling system and mechanical arm, the procedures of disc copying can be done automatically, thus faster and more efficiently than in the past.

Because the disc tray of the optical disk drive extends out completely, the mechanical arm can retrieve the disc. But as more and more computers are designed to be smaller, their disc trays do not extend out completely now. Refer to FIG. 1A, which shows a disc tray extending out completely. In this type of the optical disk drive, the disc tray for placing discs not only extends out completely but also keeps a distance D with the surface panel of the optical disk drive; therefore, discs can be retrieved by the mechanical arm using conventional way of non-slant retrieving without any difficulties. On the other hand, as shown in FIG. 1B, which shows a disc tray extended incompletely. In this type of the optical disk drive, the disc tray for placing discs is not extending completely but shrinking inside a distance D' from the surface panel of the optical disk drive; therefore, discs can't be retrieved by the mechanical arm using conventional way of non-slant retrieving because the mechanical arm would be blocked by the surface panel of the optical disk drive.

SUMMARY OF THE INVENTION

The object of the invention is to provide a disc retrieval and release apparatus and method for retrieving discs from a disc tray of an optical drive that does not extend out completely, and releasing the discs into the disc tray. By designing the mechanical arm to be a slantable structure, the present invention can work for all types of disk drivers including the optical disk drive as shown in FIGS. 1A and 1B and have more practice value.

The discs retrieval and release apparatus has a moving arm where a retrieve and release member rotatably mounts. When the user wants to process unprocessed discs, the retrieve and release member releases one of the unprocessed discs into the disc tray slantwise where there is an awaiting processing region. Thereafter, the moving arm moves near the disc tray. Then the disc tray retracts into the optical disk drive to process the unprocessed disc. The disc tray extends out from the optical disk drive after the unprocessed disc is processed. The retrieve and release member retrieves the processed disc from the disc tray slantwise. The method also uses the retrieve and release member to retrieve and release the discs slantwise. Thus, the invention releases the unprocessed disc into the wait processing region, and then retrieves the processed disc from the wait processing region after the unprocessed disc has been processed.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1A:
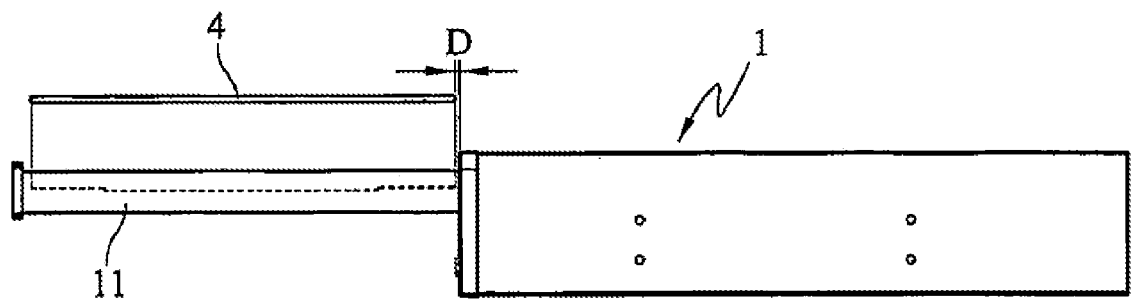
FIG. 1A shows the conventional disc tray extending out from the optical disk drive completely.
Figure 1B:
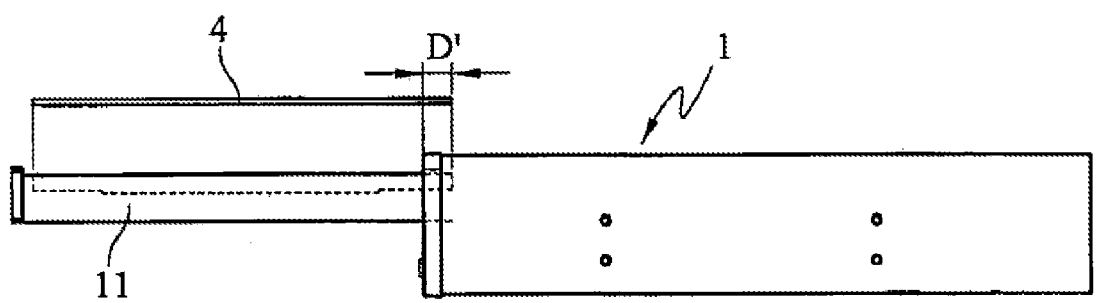
FIG. 1B shows the conventional disc tray extending out from the optical disk drive incompletely.

Referring to FIG. 1B, the optical disk drive 1 has a disc tray 11 movably mounted therein. When the disc tray 11 moves out from the optical disk drive 1, the disc tray 11 does not extend out completely. That is to say, a part of a surface of the disk tray 11 for receiving the disc 6 may remain inside the optical disk device 1 while the disk tray 11 is ejected from the optical disk device 1. The disc 6 thus cannot be put on the disc tray 11 easily.

Figure 2:
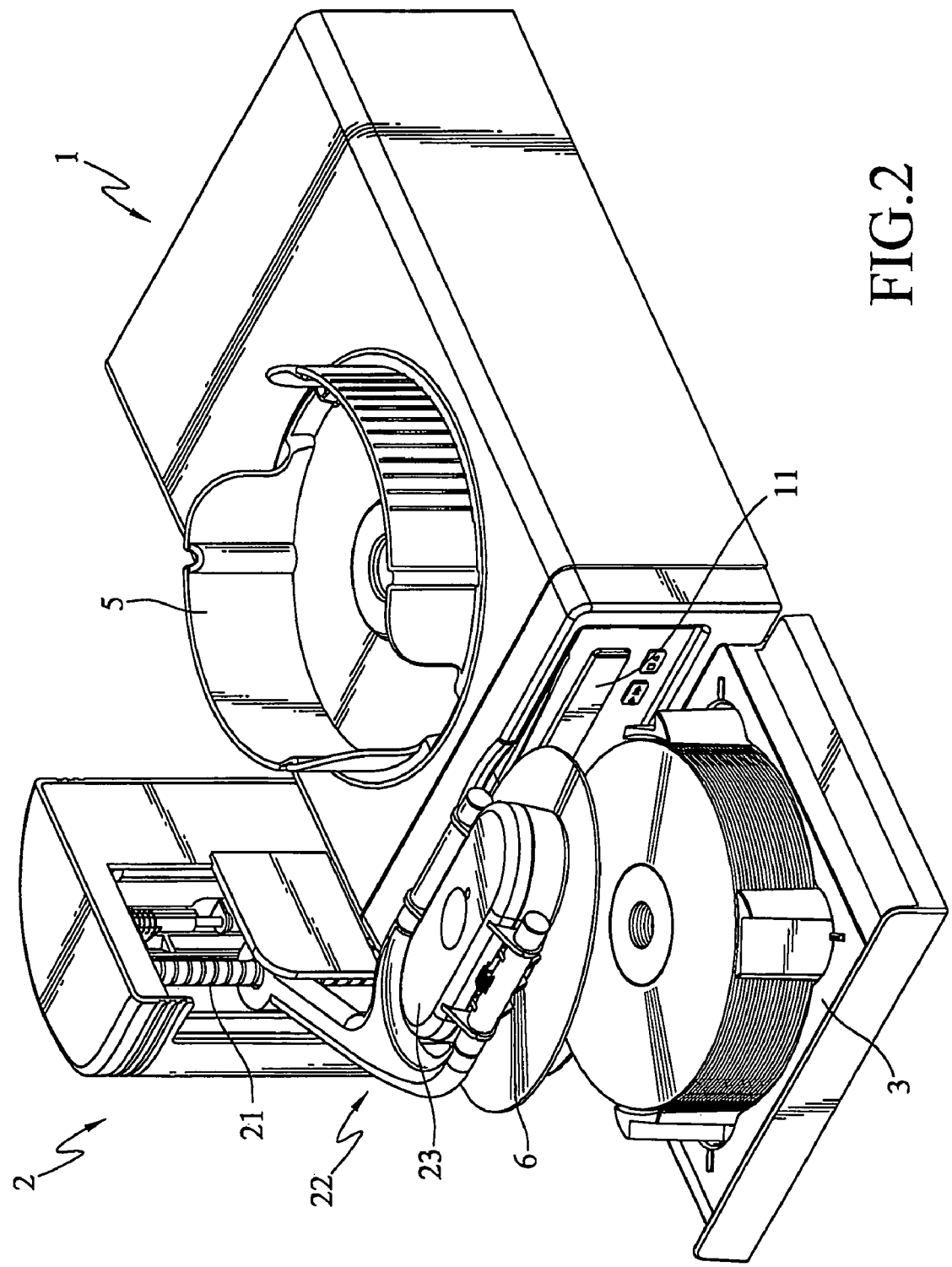
FIG. 2 shows the structure of the invention.
Figure 3A:
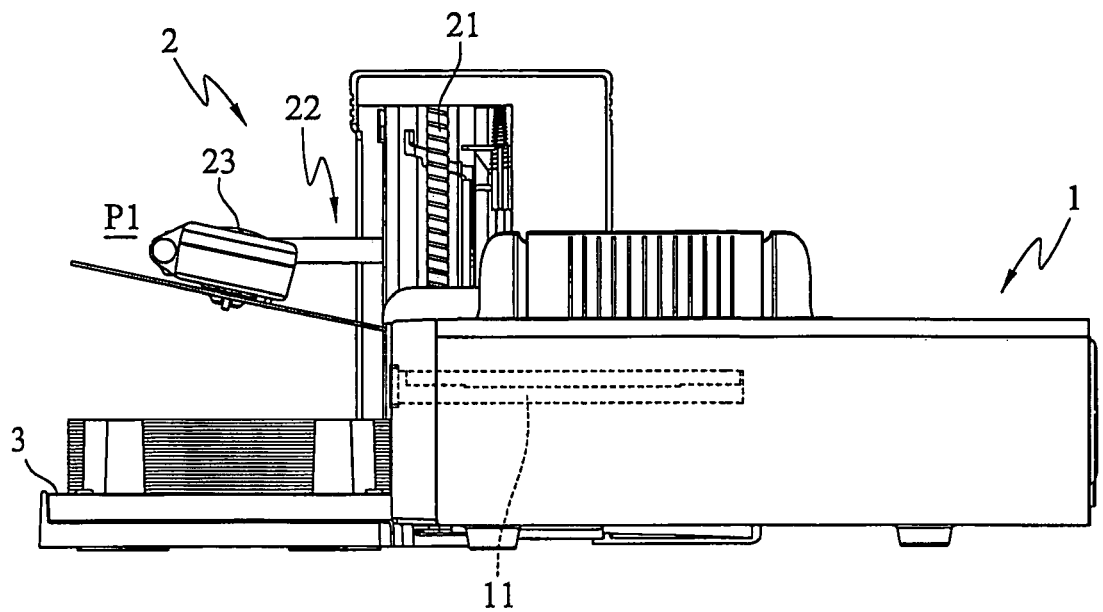
FIGS. 3A to 3E show the apparatus of the invention moving the discs to be processed from the first position to the second position.
Figure 3B:
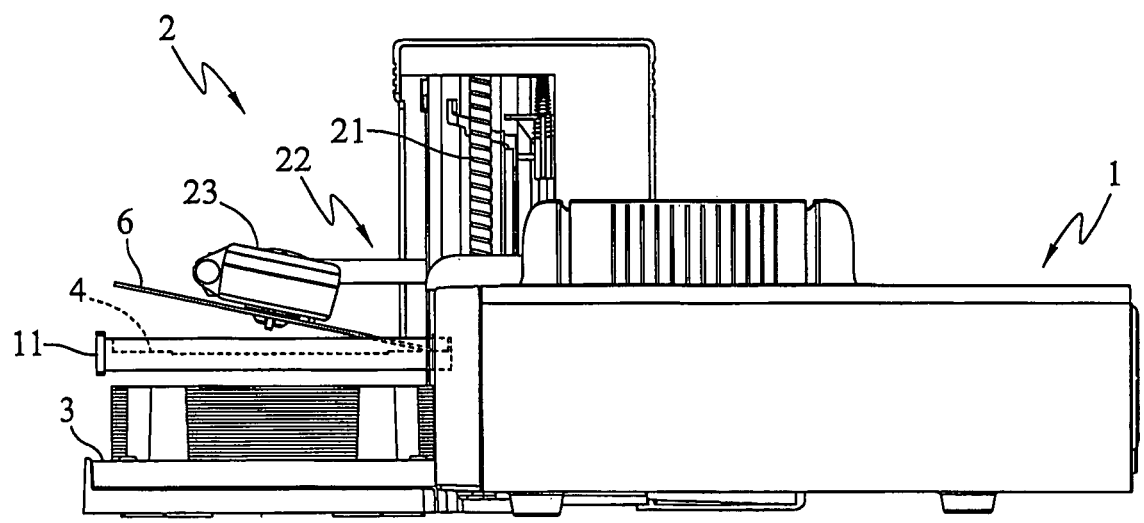
Figure 3C:
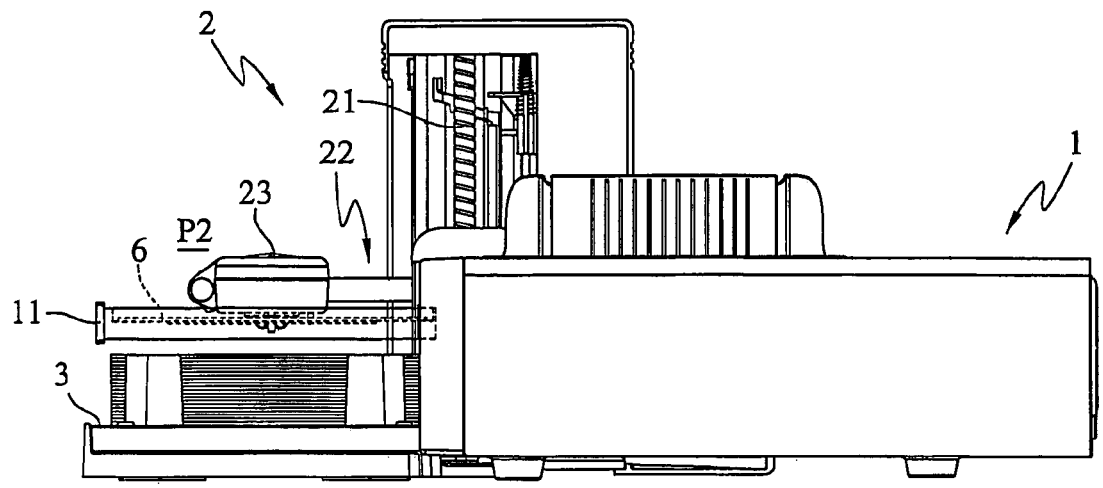
Figure 4A:
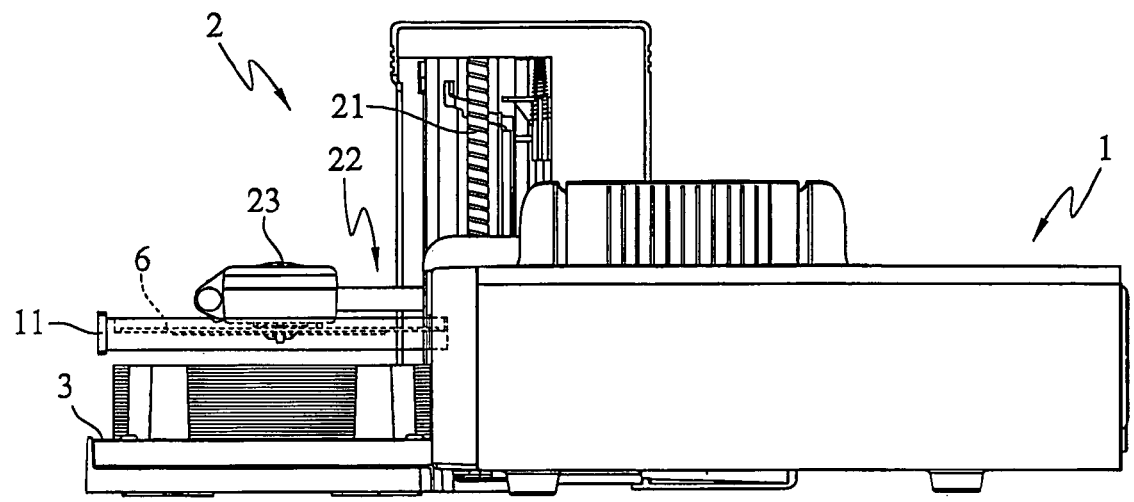
FIGS. 4A to 4C show the apparatus of the invention moving the discs to be processed from the second position to the third position.
Figure 4B:
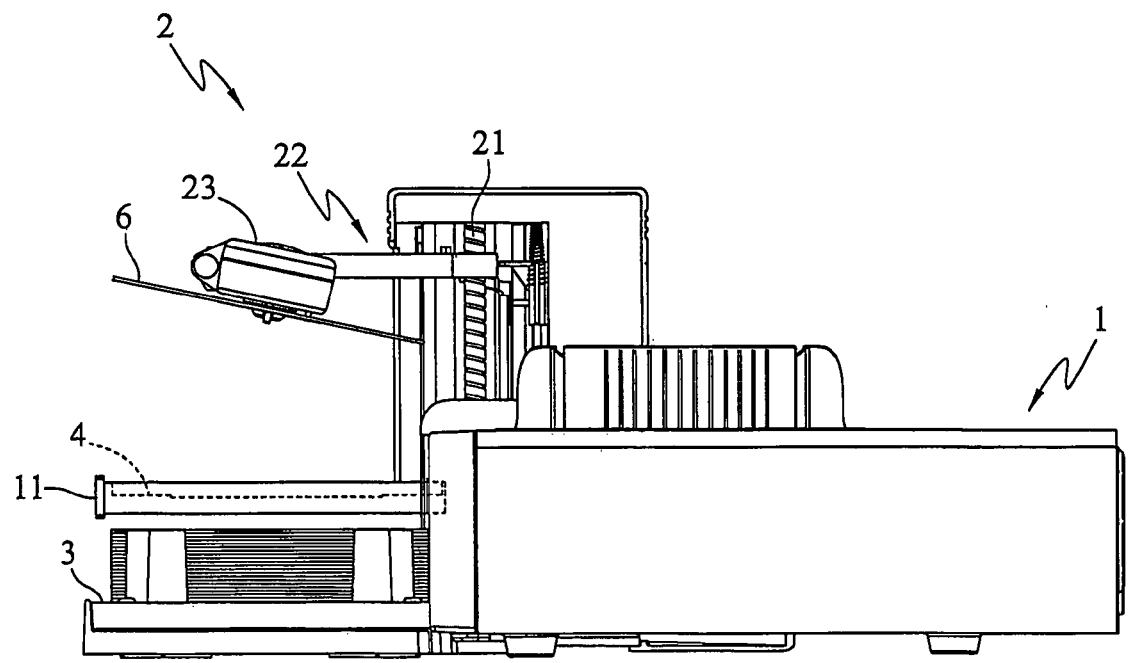
Figure 4C:
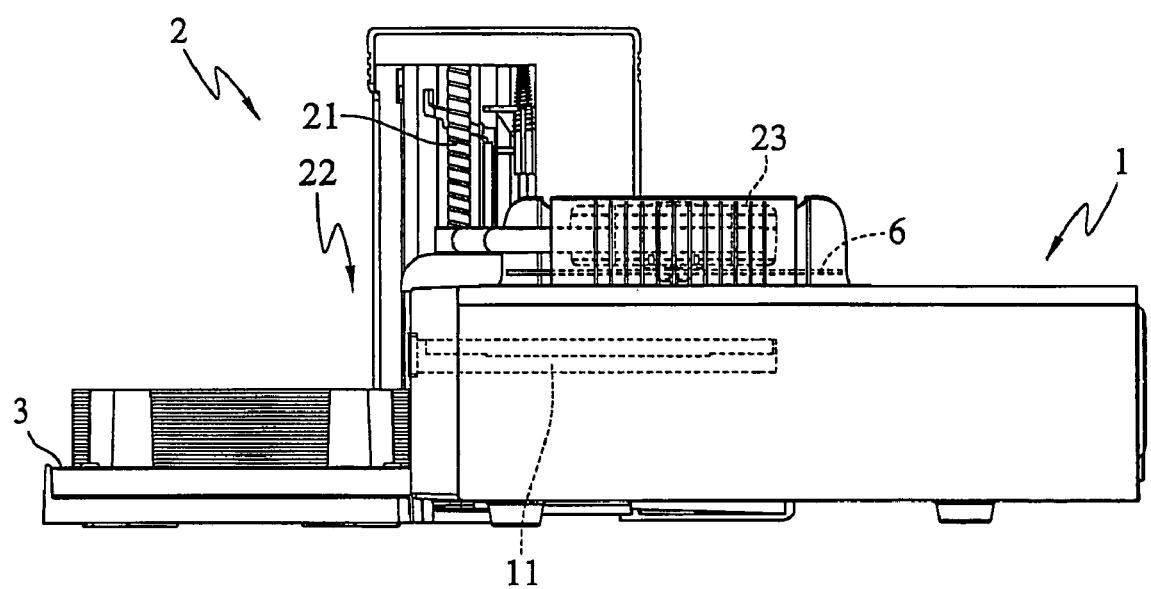

To resolve the abovementioned disadvantages, example embodiments disclose a disc retrieval and release apparatus that can retrieve discs 6 from a disc tray 11 and release the discs 6 into the disc tray 11. Referring to FIG. 2, the optical disk drive 1 has a disc tray 11 movably mounted therein. The disc tray 11 does not extend out completely. The disc tray 11 is used for carrying a disc 6 to be duplicated, burned, printed, laminated, coated, etc. The clamp unit 2 mounts on one side of the optical disk drive 1 near the side where the disc tray 11 extends. The clamp unit 2 has a driving mechanism 21, a moving arm 22 and a retrieve and release member 23. The driving mechanism 21 drives the moving arm 22 to move into its first position, its second position, and its third position (as shown in FIGS. 3A, 3C, and 4C). The first position corresponds to where the unprocessed disc 6 placed, unprocessed region 3. The second position corresponds to the upper side of the extended disc tray 11, await processing region 4. The third position corresponds to where the process disc 6 placed, processed region 5. The retrieve and release member 23 is rotatably mounted on the moving arm 22. The retrieve and release member 23 has a slant position P1 and a retrieving position P2 (as shown in FIGS. 3A and 3C), and is used for retrieving and releasing one of the discs 6. Because the retrieve and release member 23 is rotatably mounted on the moving arm 22, the retrieve and release member 23 keeps a normal slant angle not only by its weight but also by setting a means for slant angle control (not shown in the figures) when the retrieve and release member 23 is in the slant position P1, i.e., while retrieve and release member 23 retrieves the disc 6 and is in the slant position P1, the retrieved disc 6 is slanted by lowering an end of the disc 6 closest to the optical disk device 1 toward the disk tray 11. The slant angle of the retrieve and release member 23 corresponds to a position of the disc tray 11. The means for slant angle control can be a spring set, a leaf spring, or a connecting rod set. The retrieve and release member 23 is horizontal when it is in the retrieving position P2, i.e., while retrieve and release member 23 retrieves the disc 6 and is in the retrieving position P2, the disc 6 is parallel to the surface of the disk tray 11 for receiving the disc 6.

Figure 3D:
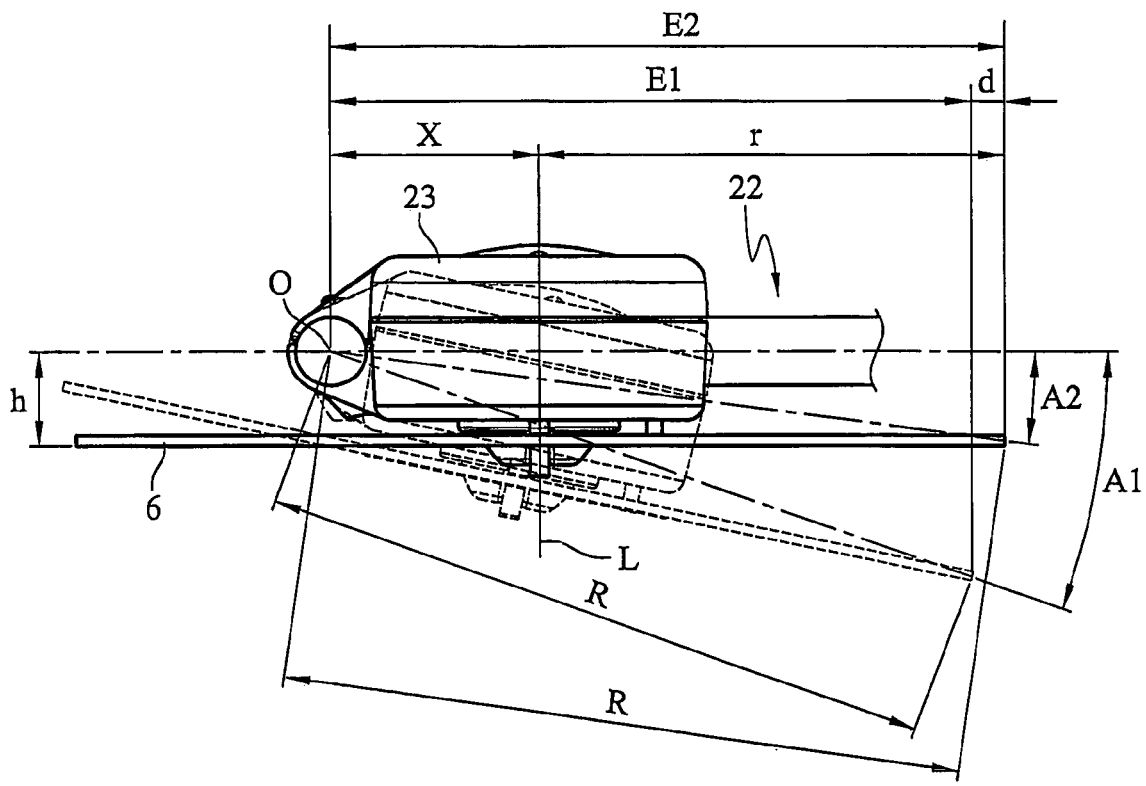

FIG. 3D is a comparison diagram of a movement from the position as shown in FIG. 3A to the position as shown in FIG. 3C. From the diagram, when a disc 6 from a slanted position as shown in FIG. 3A becomes a horizontal position as shown in FIG. 3C, the end of the disc 6 simultaneously moves a distance d of displacement.

The distance d is almost equal to the distance D' of middle way in FIG. 1B so as to avoid the disc 6 to be blocked by the surface panel of the optical disk drive and smooth the actions of retrieving discs 6.

Again please refer to FIG. 3D, the size of d can be obtained by the following formula:

$$d=E2-E1=(X+r)-(R\times\text{Cos }A1)=(X+r)-((X+r)\times\text{Cos}^{-1}A2\times\text{Cos }A1=(X+r)\times(1-(\text{Cos}^{-1}A2\times\text{Cos }A1))$$

Wherein d is the horizontal displacement distance of a far end of the disc 6 when the status of the retrieve and release member 23 changes from the slanted position back to the horizontal position. The definition of the far end is the most far away point of the disc 6 to the pipe center (O) of front end of the moving arm 22.

Wherein E2 is the horizontal distance of the pipe center (O) of the front end of the moving arm 22 to the far end of the disc 6. Further, E2=X+r, where X is the horizontal distance of the pipe center (O) to the center axle (L) of the retrieve and release member 23; where r is the horizontal distance of the far end of the disc 6 to the center axle (L) of the retrieve and release member 23.

E1 is the horizontal distance of the pipe center (O) to the far end of the disc 6 when the retrieve and release member 23 slants to the angle of A1, which can be expressed as E1=R× cos A1. The A1 is the angle composed of the slant line (R) and the horizontal axle of the retrieve and release member 23 when the retrieve and release member 23 slants. In addition the A1 can be changed to any angle depending on the need of the distance d. The definition of the slant line (R) is a straight line from the pipe center (O) to the far end of the disc 6.

Besides, the horizontal axle of the retrieve and release member 23 is the horizontal line passing the pipe center (O) of the retrieve and release member 23, where R is the slant distance from the pipe center (O) to the far end of the disc 6 and can be obtained by the formula R=(X+r)×cos−1 A2, i.e., a joint where the retrieve and release member 23 is rotatably mounted on the moving arm 22 is in a side of a center of the retrieved disc 6 opposite to the other side closest to the optical disk device 1. The A2 is the angle composed of the horizontal axle and the slant line (R) and can be set to any angle according to the need of X, r and h. wherein the h is the vertical distance from the pipe center (O) to the bottom side of the disc 6.

Figure 3E:
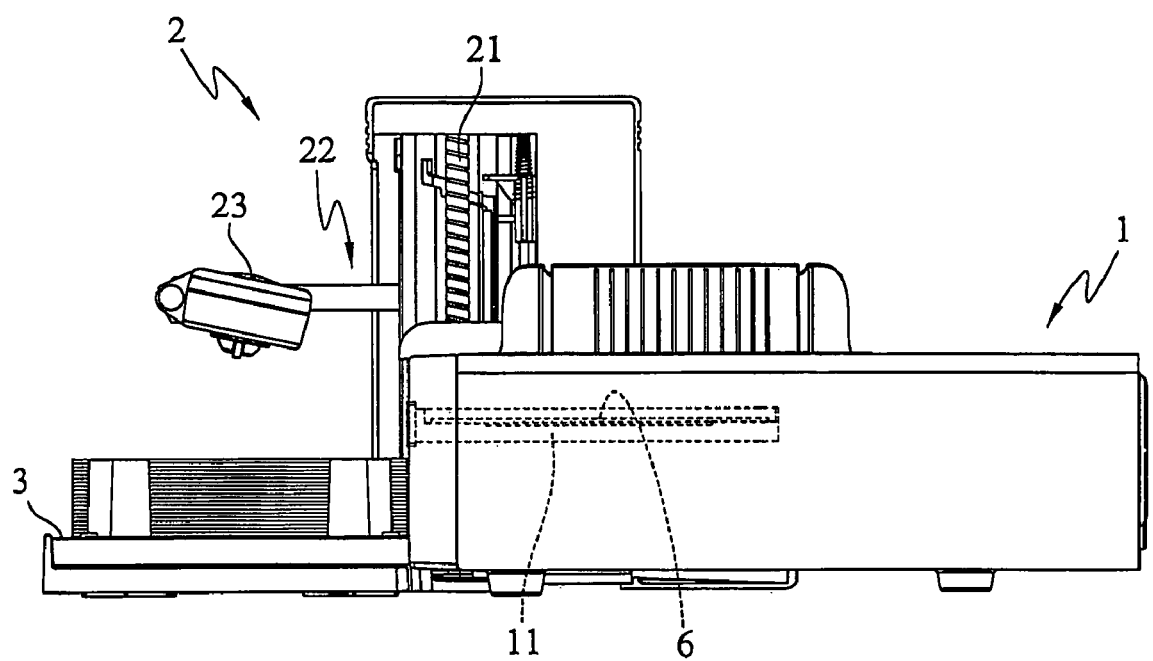

As shown in FIG. 3E, when a user wants to process a lot of discs 6 automatically by the invention, the user has to put the unprocessed discs 6 in a stack in the unprocessed region 3. Then the driving mechanism 21 of the clamp unit 2 drives the moving arm 22 to the first position, and the retrieve and release member 23 changes its position from the slant position P1 to the retrieving position P2. It makes contact with the upper surface of the upper unprocessed disc 6 to retrieve the disc 6, as shown in FIG. 3A. When the driving mechanism 21 drives the moving arm 22 from the first position to the second position, i.e., the moving arm 22 may move with respect to the disk tray 11 along a direction perpendicular to the surface of the disk tray 11 for receiving the disc 6, the disc tray 11 extends out from the optical disk drive 1 without affecting the clamp unit 2. Also, the retrieve and release member 23 changes its position from the retrieving position P2 to the slant position P1 first until the moving arm 22 moves to the second position. The retrieve and release member 23 changes its position from the slant position P1 to the retrieving position P2 as the clamped unprocessed disc 6 makes contact with the upper side of the extended disc tray 11. Please refer to FIG. 3B. As the driving mechanism 21 drives the moving arm 22 to exit the awaiting processing region 4, the retrieve and release member 23 changes its position to the slant position P1. Afterward, the disc tray 11, which carries the unprocessed disc 6, retracts into the optical disk drive 1 to process the disc 6. Thus, the unprocessed discs 6 in the unprocessed region 3 can be processed one by one automatically.

After the disc 6 is processed, the invention retrieves the processed disc 6 from the disc tray automatically. The disc tray 11 extends out from the optical disk drive 1 and the retrieve and release member 23 changes its position from the slant position P1 to the retrieving position P2 as it makes contact with the upper surface of the processed disc 6. For retrieving the disc 6 when the moving arm 22 is in the first position, refer to FIG. 4A. Through the same driving way mentioned above, the moving arm 22 is driven by the driving mechanism 21, and moves with the retrieve and release member 23. The moving arm 22 moves to the third position with the retrieve and release member 23 and the clamped processed disc 6, as shown in FIG. 4B. When the moving arm 22 moves to the third position, the retrieve and release member 23 changes its position to the retrieving position P2 for releasing the processed disc 6 in the processed region 5. Please refer to FIG. 4C. The processed discs 6 can thus be put in a stack.

Therefore, the invention retrieves the unprocessed discs 6 in the unprocessed region 3 and puts them in the disc tray 11 to be processed; it then retrieves the processed discs 6 from the processed region 5 one by one automatically. So, it does not matter whether the unprocessed discs 6 are processed in a disc tray 11 that extends out completely or not.

By the disc retrieval and release apparatus disclosed, a method for discs entering into and exiting from the wait processing region 4 uses the retrieve and release member 23 of the moving arm 22 to release one of the discs 6 into and retrieve it from the await processing region 4. The retrieve and release member 23 enters and exits the wait processing region 4 slantwise when the moving arm 22 moves thereto. The retrieve and release member 23 is rotatably mounted on the moving arm 22, so the retrieve and release member 23 can slant at an angle. The slant angle corresponds to a position of the wait processing region 4. The retrieve and release member 23 releases the discs 6 horizontally after the retrieve and release member 23 enters the wait processing region 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc retrieval and release apparatus for retrieving and releasing a disc in connection with an optical disk device, wherein the optical disk device has a panel surface and a disk tray movable with respect to the panel surface between a retracted position, where the disk tray is completely retracted inside the optical disk device, and an extended position, where the disk tray is extended out from the panel surface such that a part of the disk tray remains inside the optical disk device, and wherein the disc is retrievable from and releasable into the disk tray of the optical disk device, comprising:
   a driving mechanism;
   a moving arm engaged with the driving mechanism, movable with respect to the disk tray along a vertical direction perpendicular to and along a horizontal direction parallel to the surface of the disk tray among a first position, a second position and a third position and an awaiting position; and
   a retrieve and release member for retrieving and releasing the disc, rotatably mounted on the moving arm to rotate between a retrieving position, where the retrieved disc is parallel to the surface of the disk tray, and a slant position, where the retrieved disc is slanted such that an end of the retrieved disc proximal to the panel surface of the optical disk device is lowered toward the disk tray and is not blocked by the panel surface of the optical disk device while the moving arm is moved along the vertical direction,
   wherein the driving mechanism is configured to drive the moving arm to move among the first position, the second position, the third position and the awaiting position and the retrieve and release member to rotate between the slant position and the retrieving position, such that in operation,
   (i) the moving arm moves to the first position, wherein when the moving arm moves to the first position, the retrieve and release member rotates from the slant position to the retrieving position to retrieve a disk from a first disk stack;
   (ii) the moving arm moves from the first position to the second position while the retrieve and release member with the retrieved disk rotates from the retrieving position to the slant position, wherein when the disc tray extends out from the panel surface of the optical disk device, the retrieve and release member rotates from the slant position to the retrieving position to release the retrieved disc into the disc tray;
   (iii) the moving arm moves from the second position to the awaiting position while the retrieve and release member rotates from the retrieving position to the slant position, and the disc tray receiving the disc retracts inside the optical disk device;
   (iv) the moving arm moves from the awaiting position to the second position while the retrieve and release member rotates from the slant position to the retrieving position to retrieve the disc from the disk tray when the disc tray carrying the disc re-extends out from the panel surface of the optical disk device; and
   (v) the moving arm moves from the second position to the awaiting position while the retrieve and release member with the retrieved disc rotates from the retrieving position to the slant position; and
   (vi) the moving arm moves from the awaiting position to the third position, wherein when the moving arm moves to the third position, the retrieve and release member with the retrieved disc rotates from the slanted position to the retrieving position to release the disc into a second disk stack.

2. The apparatus of claim 1, wherein the retrieve and release member is normally positioned in the slant position.

3. The disc release apparatus of claim 1, wherein the retrieve and release member is rotatably mounted on the moving arm at a joint that is in a side of the retrieved disc distal to the panel surface of the optical disk device.

4. The apparatus of claim 1, wherein the moving arm moves among the first position, the second position and the awaiting position along the vertical direction, and wherein the moving arm moves between the awaiting position and the third position along the horizontal direction.

5. A method for releasing a disc into a disk tray of an optical disk device, comprising:
   providing and holding a disc;
   ejecting the disk tray from the optical disk device, so that a part of the disk tray for receiving the disc remains inside the optical disk device while the disk tray is ejected from the optical disk device;
   rotating the disc in a slanted position such that an end of the disc proximal to the optical disk device is lowered toward the disk tray;
   moving the rotated disc along a direction vertical to a surface of the disk tray for releasing the disc, wherein the disc is rotated so that the moving path of the end of the disc is not blocked by a panel surface of the optical disk device;
   when the end of the disc contacts the surface of the disk tray, rotating the disc to a position so that the disc is parallel to the surface of the disk tray; and releasing the disc.

6. The method of claim 5, further comprising the step of moving the disc along a direction parallel to the surface of the disk tray.

7. A disc retrieval and release apparatus for retrieving and releasing a disc in connection with an optical disk device, wherein the optical disk device has a panel surface and a disk tray movable with respect to the panel surface between a retracted position, where the disk tray is completely retracted inside the optical disk device, and an extended position, where the disk tray is extended out from the panel surface such that a part of the disk tray remains inside the optical disk device, and wherein the disc is retrievable from and releasable into the disk tray of the optical disk device, comprising:
   a driving mechanism;
   a moving arm engaged with the driving mechanism, movable with respect to the disk tray along a vertical direction perpendicular to and along a horizontal direction parallel to the surface of the disk tray among a first position, a second position and a third position and an awaiting position; and
   a retrieve and release member for retrieving and releasing the disc, rotatably mounted on the moving arm to rotate between a retrieving position, where the retrieved disc is parallel to the surface of the disk tray, and a slant position, where the retrieved disc is slanted such that an end of the retrieved disc proximal to the panel surface of the optical disk device is lowered toward the disk tray and is not blocked by the panel surface of the optical disk device while the moving arm is moved along the vertical direction, wherein the driving mechanism is configured to drive the moving arm to move among the first position, the second position, the third position and the awaiting position and the retrieve and release member to rotate between the slant position and the retrieving position, wherein the moving arm moves among the first position, the second position and the awaiting position along the vertical direction, and wherein the moving arm moves between the awaiting position and the third position along the horizontal direction.

* * * * *